United States Patent [19]
Zucker

[11] 3,731,065
[45] May 1, 1973

[54] CODED DOCUMENT
[75] Inventor: Fredric E. Zucker, Stamford, Conn.
[73] Assignee: Pitney-Bowes, Inc., Stamford, Conn.
[22] Filed: Oct. 8, 1970
[21] Appl. No.: 79,193

[52] U.S. Cl....235/61.12 N, 179/6.3 CC, 340/149 A, 235/61.7 B
[51] Int. Cl........G06k 7/12, G06k 19/06, H04q 9/14, H04m 17/02
[58] Field of Search ................179/6.3 CC; 235/61.12 R, 61.12 N, 61.7 B, 61.11 E; 340/149 A; 250/219 DC

[56] References Cited

UNITED STATES PATENTS

| | | | |
|---|---|---|---|
| 3,444,517 | 5/1969 | Rabinow | 340/146.3 |
| 3,529,133 | 9/1970 | Kent | 235/61.11 E |
| 3,184,714 | 5/1965 | Brown | 340/149 A |
| 3,513,441 | 5/1970 | Schwend | 235/61.7 B |
| 3,527,927 | 9/1965 | Bijleveld | 235/61.11 E |
| 3,573,436 | 4/1971 | Berler | 235/61.11 E |
| 3,502,851 | 3/1970 | Kakimoto | 235/61.12 R |
| 3,543,007 | 11/1970 | Brinker | 235/61.11 E |
| 3,394,246 | 7/1968 | Goldman | 235/61.7 B |
| 3,320,369 | 5/1967 | Hershey | 179/90 CL |
| 3,474,230 | 10/1969 | McMillen | 235/61.7 R |

*Primary Examiner*—Maynard R. Wilbur
*Assistant Examiner*—Robert M. Kilgore
*Attorney*—William D. Soltow, Jr., Albert W. Scribner, Martin D. Wittstein and Louis A. Tirelli

[57] ABSTRACT

A Touch-tone coded credit card employing first and second code groups, the first group having four bit positions and the second group three bit positions, one of which is utilized in each group to identify a decimal digit. The card is provided with a non-coded area (used for a magnetic or signature stripe) which is positioned opposite the first code group, and is at least as wide. If the card is reversed side-to-side when positioned in a code reader, no output is derived from the first code group because the reader scans the non-coded area. This fact can be employed to prevent faulty operation of the card reading system.

1 Claim, 3 Drawing Figures

Patented May 1, 1973
3,731,065
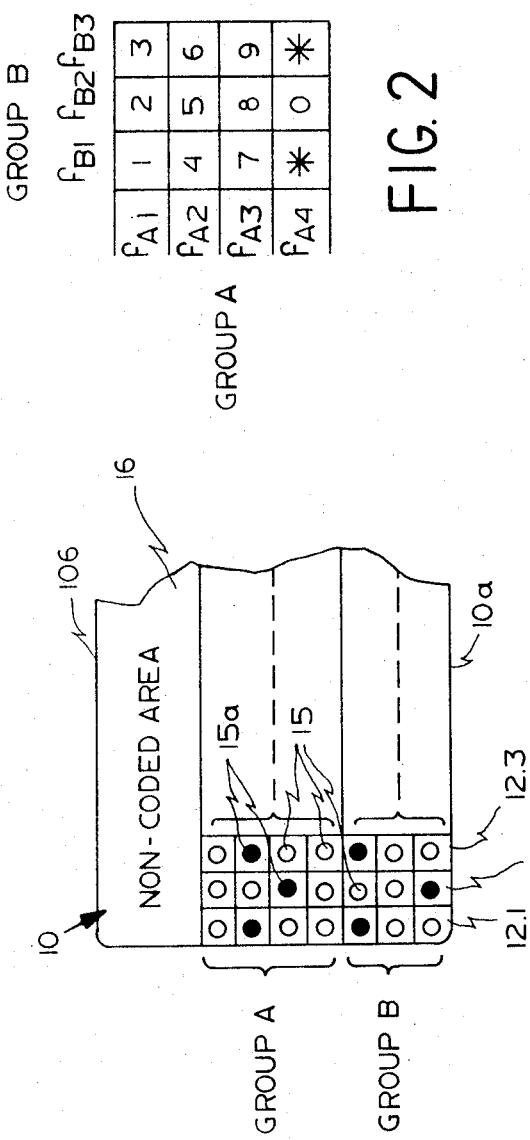
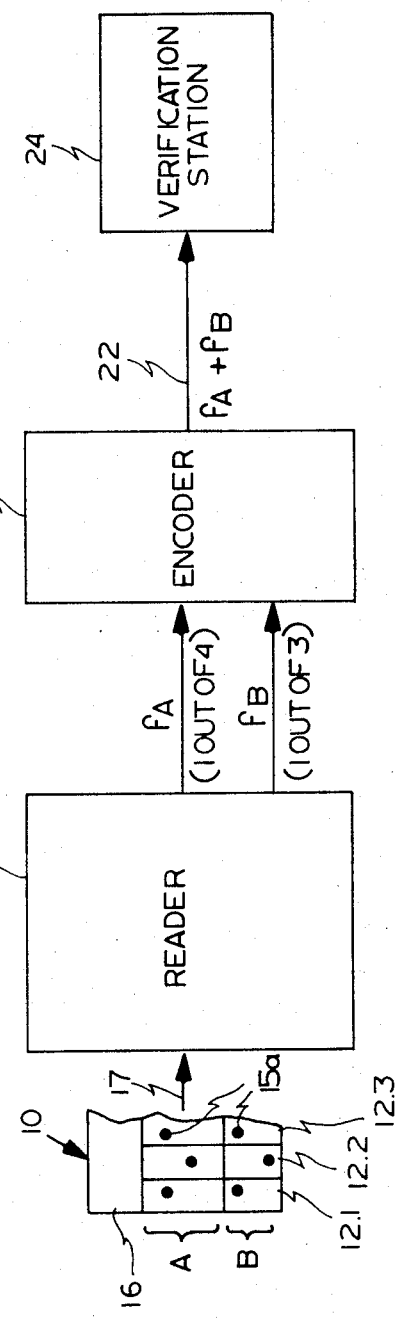
INVENTOR.
FREDRIC E. ZUCKER
BY Albert W. Scribner

CODED DOCUMENT

FIELD OF THE INVENTION

This invention relates generally to machine-readable documents, and particularly to a credit card which is coded for use in a reading and verifying device, and designated to prevent improper reading of the card when it is inadvertently reversed in the device.

BACKGROUND OF THE INVENTION

A prominent feature of the economy in recent years has been the use of credit cards, bank drafts, checks, and other substitutes for cash. This has led to some abuses, particularly in the credit card field, where use of cards that are outdated, cancelled, lost, stolen, or even spurious has made some form of card verification high desirable. Some business establishments maintain and check lists of bad accounts, while others manually telephone a central information bank for verification. Both procedures are expensive, time consuming, error-prone and inconvenient. The most reliable and efficient method of verification employs an automatic system incorporating a device which reads the card automatically, and transmits information automatically over telephone lines to a computer-operated central station.

This invention is intended for use in such a system, as well as in other document-reading applications; and is directed to the problem of providing information on the card or other document which can be easily read and transmitted by an automatic reading machine, and which will not produce a faulty transmission even if the document is improperly placed in the reader.

SUMMARY OF THE INVENTION

In one illustrative embodiment of the invention, a coded credit card, bank check or other document for use in an automatic reading system has a plurality of code groups thereon, each of which furnishes at least one information bit for coding a given alphanumeric character. The document also has a non-coded area which is located opposite to, and is at least as wide as, one of the code groups; so that inverted positioning of the document in a reader, or any other improper placement, produces no response from at least one code group, a fact which can be used to prevent faulty operation of the system in which the document is employed.

BRIEF DESCRIPTION OF THE DRAWINGS

FIG. 1 is a fragmentary view of a coded credit card in accordance with the present invention.

FIG. 2 shows a push-button telephone keyboard, and is used as a table for explaining one form of code which may be utilized in the present invention.

FIG. 3 shows a block diagram of a system for verifying the coded credit card of FIG. 1.

The same reference characters refer to the same elements throughout the several views of the drawing.

DETAILED DESCRIPTION OF THE PREFERRED EMBODIMENT

The particular coded document which will be described herein is a machine-readable plastic credit card (generally designated 10), but it will be apparent that the principles of this invention are applicable to other types of documents and document-reading systems. The credit card 10 has a plurality of photoelectrically readable spots forming coded alphanumeric character representations 12 thereon. The spots are arranged in code groups A and B. Groups A of all the characters 12 are aligned in the center of the card, and groups B are aligned along one edge 10a. The locations of only three coded characters 12.1 through 12.3 are indicated explicitly; but room exists on a standard-sized credit card (3 ⅜ × 2 ⅛ inches) for a considerably greater number of such characters.

Along edge 10b of the card, opposite code group B, the card 10 has an area 16 which is devoid of photoelectrically machine-readable markings described above. The area could be occupied by a signature stripe. Most such cards are made of plastic materials such as polyvinyl chloride, which are not receptive to ink. Therefore a strip of paper or other ink-receptive material is often secured to the card to receive the written signature of the card subscriber (for comparison with a signature written at the time a sale is consummated). Alternatively, area 16 could be occupied by a magnetic code strip, to make the card readable by magnetic as well as photo-electric equipment.

Each code group A and B of each character 12 has a plurality of bit positions 15, some of which are imprinted with data bits, i.e., photo-electrically readable spots 15a. The latter are preferably imprinted with a luminescent marker material which is invisible under normal illumination, making it more difficult to tamper with the card. The marker material is readable photoelectrically, however, under ultra-violet illumination.

Other machine-readable bit-marking materials are also comtemplated; such as magnetic spots, conductive ink, ordinary ink, etc., for reading by magnetic, photoelectric, or any equivalent means. Whatever machine-readable format is selected for code groups A and B, however, the stripe 16 must be devoid of any information in that same format, but it may contain information in any other machine-readable format. If the code groups A and B are coded in a luminescent format, for example, the stripe 16 can contain a signature, but not one which is written in luminescent ink. Or if the code groups are in a conventional (i.e. non-luminescent) photo-electrically readable format, the stripe 16 should be of uniform appearance, devoid of any signature, but it may contain mangetically coded data. If the code groups are in a magnetic format, on the other hand, the stripe 16 may not be magnetically coded, but it may contain a signature written with luminescent material or any other kind of non-magnetic ink.

In these drawings, incidentally, the lines seen on credit card 10 are imaginary ones employed only for illustrative purposes, to delineate the character areas 12 and their code groups A and B. Such lines do not normally appear on an actual credit card.

In order to facilitate transmission of information from the credit card reader over telephone lines to a computer-operated verifying station, the preferred code format is the two-frequency-tone push-button telephone code known as Touch-tone in the Bell System's terminology. In this code each character is represented by a particular combination of two frequency tones. One frequency, $fA$, is selected from a group of four tones $fA1$ through $fA4$; and the other frequency, $fB$, is selected from a group of three tones, $fB1$ through $fB3$. The exact encoding scheme for decimal characters 1 through 0 is illustrated by the push-button telephone keyboard in FIG. 2.

On the credit card 10, only one of the four bit positions in group A is selected to represent the particular frequency $fA$, and only one of the three bit positions in group B is selected to represent the particular frequency $fB$. In character area 12.3 of FIG. 1, for example, luminescent spots 15a occur in the second position of group A and the first position of group B, uniquely representing the decimal digit "4" in Touch-tone code. This code formal is employed for each character 12 across the card 10, to provide the plurality of digits which identify a particular credit card holder. The selected spots 15a of each character thus designate the particular two frequencies which represent each character. It will be readily apparent to those skilled in the art, however, that other plural-group code formats may be utilized.

To illustrate the use of the coded card 10 in a verification system, reference is made to FIG. 3. The card is inserted (as indicated by arrow 17) into any suitable reader 18 which then scans the card (either in the direction of arrow 17 or the opposite direction) so that the spots 15a of successive character areas 12 can be read. If the luminescent approach is employed, the reader 18 will employ an ultra-violet source to illuminate the spots, and seven separate photocell channels for scanning each of the four bit positions in code group A and the three in group B respectively. Regardless of the particular sensing technique, however, two distinct code group reading operations occur simultaneously for groups A and B respectively. At the output of the reader 18, therefore, one of four $fA$ output lines will be energized, designating a particular frequency $fA$, while one of three $fB$ output lines will be energized, designating a particular frequency $fB$. The $fA$ output in effect represents the reading of a four channel code group; while the $fB$ output represents the reading of an entirely separate three channel code group.

Both outputs $fA$ and $fB$ are applied to a conventional telephone encoder 20 which responds by generating a signal combining the selected frequency tones $fA$ plus $fB$ to represent a single character in a particular area 12. The output of the encoder is fed over a suitable telephone or other transmission line 22 to a computer-operated central station 24.

Suppose, however, that the credit card 10 is improperly inserted into the code reader. For example, it may be flipped over on its reverse side. In that case, the reader 18 will not sense a luminescent bit in either code group A or B, because there are no luminescent markings on the reverse side. The total absence of any $fA$ or $fB$ output can easily be recognized electronically as an error condition.

Alternatively, the card may be inverted side-for-side, so that non-coded area 16 is positioned in the reader 18 where code group B ought to be. When this happens, if area 16 is at least as wide as code group B, no luminescent bits 15a of code group A can be read by the photocells of group B. Therefore, the reader 18 will provide no output at all on the $fB$ side, which is also recognizable electronically as an error condition.

There will be an output on the $fA$ side, but the fact that code group B is read independently from group A enables it to stand alone as an error indicator under these circumstances. Accordingly, the credit card 10 provides a foolproof scheme for detecting any type of improper insertion into the reader 18.

To summarize and generalize the principle exemplified by the particular credit card described, any machine-readable document using any plural group code format may be similarly protected against side-to-side reversal within a reader device; provided there are at least two independently read areas (so that the absence of an output from only one particular area is readily detectable), and if the document surface area devoted to that particular information group is paired with another area devoid of machine-readable information, in such a way that document reversal will necessarily produce that no-output condition. Placement of the two areas on opposite edges of the document (as described above) is one example of such pairing; but any other arrangement would also work in which the non-machine readable area is either congruent with its paired machine-readable area, or encloses a portion which can be regarded as congruent therewith, and at least the congruent portion of the non-machineable-readable area is situated symmetrically with the machine-readable area relative to the document center line. Those conditions guarantee an exact exchange of positions when the document is reversed in a side-by-side sense.

Since the foregoing description and drawings are merely illustrative, the scope of protection of the invention has been more broadly stated in the following claims; and these should be liberally interpreted so as to obtain the benefits of all equivalents to which the invention is fairly entitled.

The embodiments of the invention in which an exclusive property or privilege is claimed are defined as follows:

1. A substantially rectangular document bearing information encoded in a machine-readable format including a plurality of code groups each of which furnishes at least one essential bit of information for each coded character; said document comprising on at least one face thereof:
   a. a first area adjacent a first edge of said document and bearing a first one of said code groups;
   b. a second area adjacent said first area and bearing the remainder of said code groups;
   c. and a third area adjacent an edge of said document opposite said first edge, said third area being at least as large as said first area in a direction transverse to said edges whereby incorrect positioning of said document in a reader device interposes said third area in the portion of said reader which is designed to read first area, and said third area is devoid of code bits of said format whereby the absence of an output derived from said first area provided an indication of the incorrect positioning of said document in said reader;
   there being at least first and second code groups, the first code group having at least three bit positions and the second code group having at least four bit positions, and said code format employing at least one photo-electrically readable bit in each group;

said non-coded third area being contiguous to said second code group area;

said bits employed in said first and second code groups being imprinted with luminescent material; and said document being a non-ink-receptive card and said non-coded third area being covered with an ink-receptive material to carry a signature.

* * * * *